United States Patent

Lightner

[11] Patent Number: 6,007,636
[45] Date of Patent: Dec. 28, 1999

[54] METHOD TO RECYCLE AN AQUEOUS ACIDIC LIQUOR USED FOR DEPOLYMERIZATION OF CELLULOSE

[76] Inventor: Gene E. Lightner, 706 SW. 296th St., Federal Way, Wash. 98023-3549

[21] Appl. No.: 09/224,700

[22] Filed: Jan. 4, 1999

[51] Int. Cl.[6] ............... C07H 3/00; C13K 1/02
[52] U.S. Cl. ............................................. 127/37
[58] Field of Search ................................ 127/37

[56] References Cited

U.S. PATENT DOCUMENTS

| | | | |
|---|---|---|---|
| 4,237,226 | 12/1980 | Grethlein | 435/99 |
| 4,608,245 | 8/1986 | Gaddy et al. | 423/531 |
| 5,188,673 | 2/1993 | Clausen et al. | 127/37 |
| 5,411,594 | 5/1995 | Brelsford | 127/37 |

OTHER PUBLICATIONS

Madison Wood Sugar Proc. Ind. & Eng. Chem Harris, vol. 38, No. 9, E. E, et al., pp. 890.
Ehtanol from Cellolosic Residues & Crops, Moore, M.R., et al, p. A–65, 1987 Biochemical/Alcohol Fuels Program Ann. Rpt., p. A–65.
Concetrated acid Hydrolysis w/Acid Reovery, Prieto, et al. 1987 Biochemical/Alcohol Fuels Program Ann. Rpt., p. A–95.
Acid Hydrolysis Research, Wright, J.D., et al., 1987 Biochemical/Alcohol Fuels Program Annual Rept. p. A–15.

Primary Examiner—David Brunsman

[57] ABSTRACT

A method to recycle aqueous acidic liquor used to form depolymerized cellulose and hemicellulose accompanying cellulose, contained in biomass, by hydrolysis in the aqueous acidic liquor. Cellulose is dissolved in the aqueous acidic liquor and then remains in place to hydrolyze cellulose to form depolymerized cellulose in the aqueous acidic liquor. The depolymerized cellulose, including dextrins, oligosaccharides, and glucose is substantially separated from the aqueous acidic liquor. The separated aqueous acidic liquor is then recycled to dissolve and hydrolyze additional cellulose to form additional depolymerized cellulose.

18 Claims, 3 Drawing Sheets

METHOD TO RECYCLE AN AQUEOUS ACIDIC LIQUOR USED FOR DEPOLYMERIZATION OF CELLULOSE

BACKGROUND OF THE INVENTION

Throughout the world there is increasing interest in converting renewable biomass to usable products such as ethanol. Conversion of wood to ethanol has been practiced during wartime due to a shortage of liquid fuels. Reported in Ind. & Eng. Chem. Vol. 38 No. 9, P. 890 (1946). Because of poor yields and consumption of chemicals the conversion was found not to be economical for peacetime use. Present day interest in hydrolysis of biomass is to provide an alternative fuel source to avoid dependence on unreliable imported petroleum crude oil for liquid fuels. Biomass often contains hemicellulose and lignins accompanying the cellulose contained in the biomass. The hemicellulose and amorphous cellulose of the biomass is easily hydrolyzed, in a process termed pre-hydrolysis, leaving a residue containing lignins and un-hydrolyzed crystalline cellulose. Pre-hydrolysis consists of reacting water with biomass materials in the presence of a catalyst, usually an acid. Control of temperature of the hydrolysis and concentration of the acid is adjusted to control the kinetic rate of hydrolysis. Conventional processes center around acidic hydrolysis of biomass to produce glucose and pentoses. Pentoses, by continued hydrolysis conditions, may be reacted to form furfural. Biomass is a term used to describe material containing cellulose including: paper, pulp, wood waste, sawdust, municipal solid waste (MSW), agricultural wastes, fabrics, and cotton.

A state of the art hydrolysis process, described in U.S. Pat. No. 5,411,594, uses two stages to hydrolyze biomass materials The first stage is operated at low temperature and low pressure where both hemicelulose and amorphous cellulose are readily hydrolyzed. Residue from the first stage, containing lignins and difficult to hydrolyze cellulose, is removed and sent to a second stage operating at high pressure and high temperature for hydrolysis of crystalline cellulose. The hydrolyzate from the high pressure and high temperature stage contains acid and glucose and glucose degradradation products, 5-hydroxymethylfurfural (HMF). HMF is formed rapidly from glucose at high temperatures thus limiting the yield of glucose. Kinetic reaction rate of HMF is dependent on concentration of glucose and temperature.

Another process for converting biomass to glucose, described in U.S. Pat. No. 4,237,226, uses two stages. The first stage operating at low temperature and dilute acid will pre-hydrolyze hemicellulose and amorphous cellulose contained in biomass. Residue, containing crystalline cellulose and acid, from the first stage is neutralized then added to a second stage to hydrolyze the cellulose with added enzymes. This slow-acting hydrolysis process requires use of sterilized biomass residue in sterilized reactors. The cost of the enzymes is much more than that for acids.

A state of the art process being developed at TVA, reported in FY 1997 BIOCHEMICAL conversion/ ALCOHOL FUELS PROGRAM: Annual Report PA.-65. Upon pre-hydrolysis of corn stover, with dilute acid in a first stage, residue from the first stage is treated with additional acid and then the residue is dried at low temperature to concentrate the acid contained in the residue. The resulting residue contains concentrated acid and crystalline cellulose which is rapidly hydrolyzed in a second stage reactor operating at low temperature. Un-hydrolyzed crystalline cellulose is contained in a residue with lignins.

Also, a state of the art process being developed by workers at the University of Arkansas, is reported in FY 1997 BIOCHEMICAL conversion/ALCOHOL FUELS PROGRAM: Annual Report PA.-85. It employs high concentration of sulfuric acid to convert corn stover to sugars. They describe a process scheme to separate sugars contained in the concentrated sulfuric acid using a heavy boiling solvent to dissolve the sulfuric acid and a low boiling solvent to dissolve the heavy boiling solvent. They also report that this method has a loss of solvents and a loss of sulfuric acid which is neutralized with lime.

Reported in the above named report, on page A-15, is a plan by TVA to develop a high concentration of sulfuric acid process. The current focus of TVA is to develop an inexpensive process for recovering the high concentration of sulfuric acid. Thus the problem of recovering sulfuric acid has not yet been solved.

It is well known that a high concentration of sulfuric acid will hydrolyze cellulose and hemicellulose at low temperatures to form water soluble depolymerized products which can be altered by enzymes to produce sugars for fermentation. The problem with this method is the failure to cost effectively recover the sulfuric acid. Recovery of the sulfuric acid is reported as an unsolved problem. Thus it is believed that no satisfactory recovery method has yet been developed.

The present concern is about recovering aqueous acidic liquor used to produce depolymerized cellulose and hemicellulose. This invention relates to a method of recycling aqueous acidic liquor used to produce depolymerized cellulose and hemicellulose contained in a biomass.

Therefore an object of this invention is to obviate many of the limitations and disadvantages of the prior art to hydrolyze cellulose and to ultimately produce glucose.

Depolymerized cellulose formed from aqueous acidic liquor may be hydrolyzed at low temperature to form glucose rapidly and therefore will not have time to form significant quantities of HMFs so as to reduce the lost yield of glucose.

Another object of this invention is to avoid use of costly and slow acting enzymes for hydrolysis of cellulose.

Still another object of this invention is to produce a yield of hydrolysis of cellulose and hemicellulose nearing 100%.

Yet another object of this invention is to operate and accomplish low energy consumption.

An additional object of this invention is to provide recycling of aqueous acidic liquor used to produce depolymerized cellulose and hemicellulose contained in a biomass.

With the above and other objects in view, this invention relates to the novel features and alternatives and combinations presently described in the brief description of the invention.

BRIEF DESCRIPTION OF THE INVENTION

The present invention, in its broadest aspect, will provide a method to convert biomass into water insoluble solids and desirable water soluble depolymerized products by dissolving cellulose in an aqueous acidic liquor and then forming depolymerized cellulose in place in the aqueous acidic liquor. Key features are: substantially freeing depolymerized cellulose from the aqueous acidic liquor and recycling to reuse recovered aqueous acidic liquor, hemicellulose accompanying cellulose and will also be depolymerized, recycling to reuse components integral to the method, and removing water insoluble solids containing water substantially free of components integral to the method.

The cellulose molecule is a polymer composed of a monomer of glucose units joined together by glycoside bonds to form long chains. Each cellulose molecule contains hydroxyl groups which form hydrogen bonds to neighboring cellulose molecules. The hydrogen bonds bind the cellulose molecules to prevent unconstrained access to glycoside bonds thus retarding hydrolysis with water.

Depolymerized cellulose can be produced from aqueous acidic liquor by several factors believed to be:

1) Partially or completely dissolving cellulose will dislodge hydrogen bonds, contained in hydroxyl groups, thus making glycoside bonds accessible.

2) Water, catalyzed by protons contained in an aqueous acidic liquor, can be combined with some of the accessible glycoside bonds contained in cellulose to form depolymerized cellulose. Depolymerized cellulose includes dextrins, oligosaccharides, and glucose.

3) Aqueous acidic liquor provides catalytic protons and water to the accessible glycoside bonds contained in cellulose.

Equivalent aqueous liquors that will function as aqueous acidic liquor include the group consisting of aqueous liquors of inorganic acids and aqueous liquors of organic acids including an individual or a combination of any of these acids and mixtures thereof.

Aqueous liquors of inorganic salts are often hydrolyzed and are in equilibrium with acids and bases formed by hydrolysis forming an aqueous acidic liquor. Salts may be employed that will function as aqueous acidic liquor and may be selected from the group consisting of aqueous liquors of inorganic salts including metal sulfates and metal halides and salts of thiocyanates including an individual or a combination of any of these salts and mixtures thereof.

Concentrated liquors of sulfuric acid, methanesulfonic acid or zinc chloride in the range of about 40%, water to about 10%, water can be employed to depolymerize cellulose.

The kinetic rate for depolymerization of cellulose depends on concentration of cellulose, degree of depolymerization, and on concentration of aqueous catalytic acids to provide protons and water to the accessible glycoside bonds. Time for depolymerization of cellulose at a given temperature will depend on temperature of the kinetic rate.

In this invention, aqueous acidic liquor is subject to recycle for employment in dissolving cellulose followed by hydrolyzing dissolved cellulose in place to form depolymerized cellulose in aqueous acidic liquor.

DESCRIPTION OF THE PREFERRED EMBODIMENT

The preferred embodiment of this invention embodies mixing together an aqueous acidic liquor with a biomass containing cellulose to form depolymerized polymers followed by hydrolysis in place to depolymerize the cellulose and hemicellulose accompanying the cellulose to provide water soluble depolymerized polymers and water insoluble solids. The invention embodies adding an extractate from a previous subsequent counter flow solvent extraction containing a solvent which is soluble in aqueous acidic liquor but substantially insoluble in the depolymerized polymers to form a precipitate of the depolymerized polymers and water insoluble solids. The invention embodies setting apart to divide the heretofore precipitated depolymerized polymers from a liquid containing aqueous acidic liquor and solvent and to extract any residual aqueous acidic liquor from the heretofore precipitate with a supplementary solvent and then allocating supplementary solvent heretofore employed for extraction to precipitate additional depolymerized polymers. The invention embodies dissolving the heretofore extracted precipitated depolymerized polymers, retaining solvent from the previous extraction, by adding an extractate from a subsequent counter flow water extraction which includes water and solvent to produce a mixture of dissolved depolymerized polymers, solvent, water and water insoluble solids. The invention embodies dividing the mixture to part water insoluble solids to produce a liquefied mixture of dissolved depolymerized polymers, solvent, water. Divided water insoluble solids are removed.

The operation to separate solvent from the liquid and the liquefied mixture includes vaporization and condensation of the solvent vapor for reuse. The preferred method to separate solvent involves extracting with an oil which is insoluble in the aqueous acidic liquor and insoluble in the liquefied mixture of dissolved depolymerized polymers and water but soluble in solvent. Extraction of the liquid by counter flow of oil produces an extractate containing oil and the solvent and a raffinate having two phases: the upper phase contains oil, the lower phase contains aqueous acidic liquor, substantially devoid of the solvent to provide aqueous acidic liquor for reuse. Similarly, extracting of the liquefied mixture by counter flow of oil produces an extractate containing oil and the solvent and a raffinate having two phases: the upper phase contains oil, the lower phase contains the liquefied mixture, substantially devoid of the solvent, to provide a desired product containing water and water soluble depolymerized polymers. Oil containing solvent from both upper phases are separated and then combined with oil used for extraction. Both extractives are then combined to evaporate to form a solvent vapor which is then condensed to form solvent for reuse. The oil, substantially devoid of the solvent, flows from the evaporator bottoms and, after cooling, is used for extraction.

An alternate method to separate solvent from the liquid and the liquefied mixture includes vaporization and condensation of the solvent vapor for reuse. This alternate method to separate solvent involves vaporization of the solvent to produce the aqueous acidic liquor and the liquefied mixture, both substantially devoid of the solvent. The liquid is evaporated to form solvent vapor and then followed by condensation of the solvent vapor for reuse as a solvent. The evaporator bottoms contains the aqueous acidic liquor substantially devoid of the solvent to provide aqueous acidic liquor for reuse. The liquefied mixture is distilled to form solvent vapor followed by condensation of the solvent vapor for reuse as a solvent. The distillation bottoms contain the liquefied mixture substantially devoid of the solvent to provide a desired product containing water and water soluble depolymerized polymers.

BRIEF DESCRIPTION OF THE DRAWINGS

The features that are considered characteristic of this invention are set forth in the appended claims. This invention, however, both as to its origination and method of operations as well as additional advantages will best be understood from the following description when read in conjunction with the accompanying drawings in which:

DETAILED DESCRIPTION OF THE PREFERRED EMBODIMENT

In the preferred embodiments of the present invention, a supply of biomass substantially free of water contains cellulose and frequently contains hemicellulose and lignins. The operating temperature range is about 20° C. to about 80° C.

Figure 1:
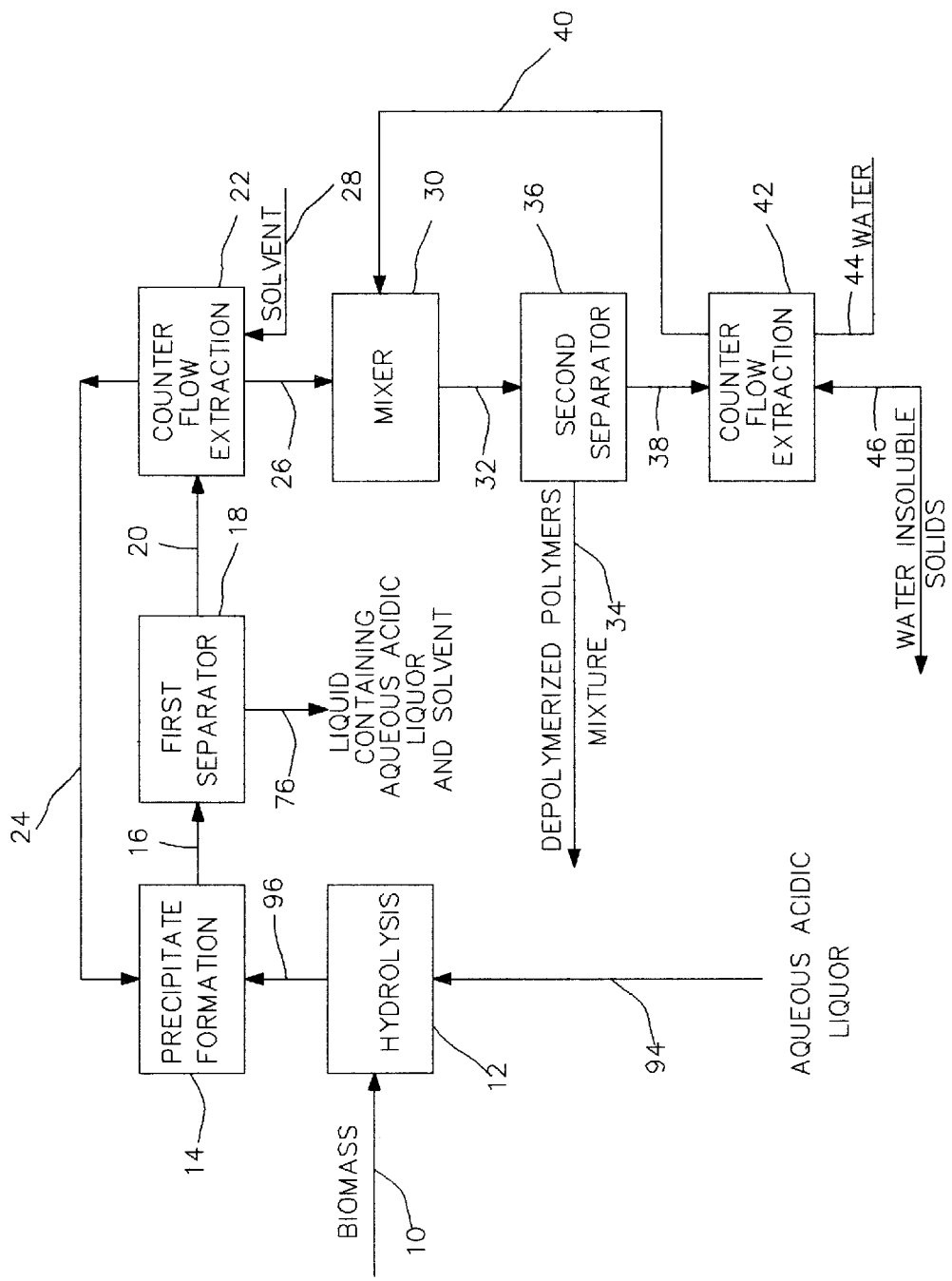
FIG. 1 is a flow sheet denoting the invention as set forth in the appended claims.

The flow diagram of FIG. 1 illustrates the general preferred embodiments of the present invention. In the diagram, rectangles represent stages or functions of the present invention and not necessarily separate components. Arrows indicate direction of flow of material in the method.

Referring to FIG. 1, biomass 10, is conveyed into a hydrolysis stage 12, where an aqueous acidic liquor 94, is forwarded to the hydrolysis stage 12 which depolymerizes cellulose and hemicellulose contained in the biomass 10 to form a mixture 96 containing water soluble depolymerized polymers, which then flows to a stage for precipitate formation 14 where precipitation of the depolymerized polymers is formed by addition of an extractate 24 containing the solvent and aqueous acidic liquor from a first solvent counter flow extraction stage 22. Solids, insoluble in solvent, containing solvent and aqueous acidic liquor 16 from the stage for precipitate formation. Precipitation 14 flows to a first separator stage 18 and then, upon separation, separates a liquid containing solvent and aqueous acidic liquor 76, for subsequent treatment, and separates solvent insoluble solids 20 which then flows to the solvent counter flow extraction stage 22 where solvent insoluble solids containing solvent and aqueous acidic liquor 26 are extracted by solvent 28, typically extracted by counter flow of solvent. Solvent insoluble solids containing solvent 26 are combined in a mixing stage 30 with an extractate containing water soluble depolymerized polymers, water and solvent 40 which is obtained from a counter flow of water extraction stage 42 and forwarded to the mixing stage 30 to form a mixture of water soluble depolymerized polymers and solvent in water and water insoluble solids 32 which then flows to a second separator stage 36 to be separated into water insoluble solids 38 and a liquefied mixture of water soluble depolymerized polymers and solvent in water 34 for subsequent treatment. The water insoluble solids 38 flows to a second water extraction stage 42 where water 44 typically extracted by counter flow of water extracts water soluble depolymerized polymers and solvent from water insoluble solids to form a raffinate 46, containing water insoluble solids and some water.

Figure 2:
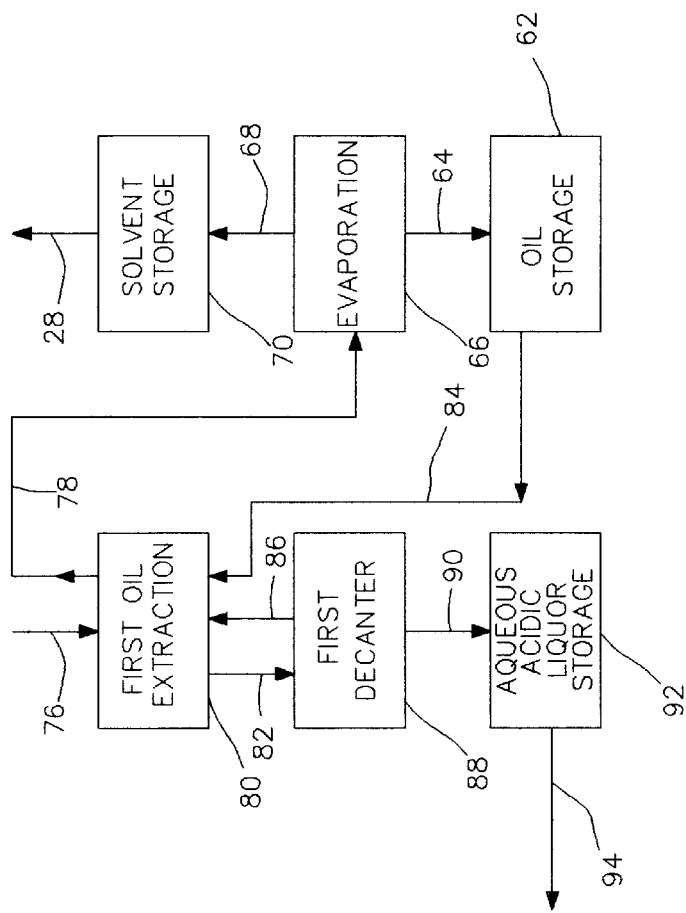
FIG. 2 is a flow sheet denoting a preferred method for separating solvent from a liquid containing aqueous acidic liquor and solvent.

Referring to FIG. 2, a flow sheet denoting a preferred separating method for parting solvent from a liquid 76 containing aqueous acidic liquor and solvent from FIG. 1, is transported to a first oil extraction stage 80, where an oil 84 supplied from oil storage, 62 soluble in the solvent but insoluble in aqueous acidic liquor, typically operating by counter flow, extracts solvent from the liquid 76 by the first oil extraction stage 80 to produce a feed 82, containing two phases, is sent to the first decanter 88 where the lower level of the first decanter 88 produces an aqueous acidic liquor 90 and is stored in aqueous acidic liquor storage 92 which provides aqueous acidic liquor 94. The upper level of the first decanter 88 separates oil 86 for transfer to the first oil extraction stage 80 where extractate 78 is forwarded to an evaporation stage 66 where solvent is evaporated and condensed 68 and is stored in solvent storage 70 to provide solvent 28. Oil 64 from the evaporation stage 66 is stored in oil storage 62.

Figure 3:
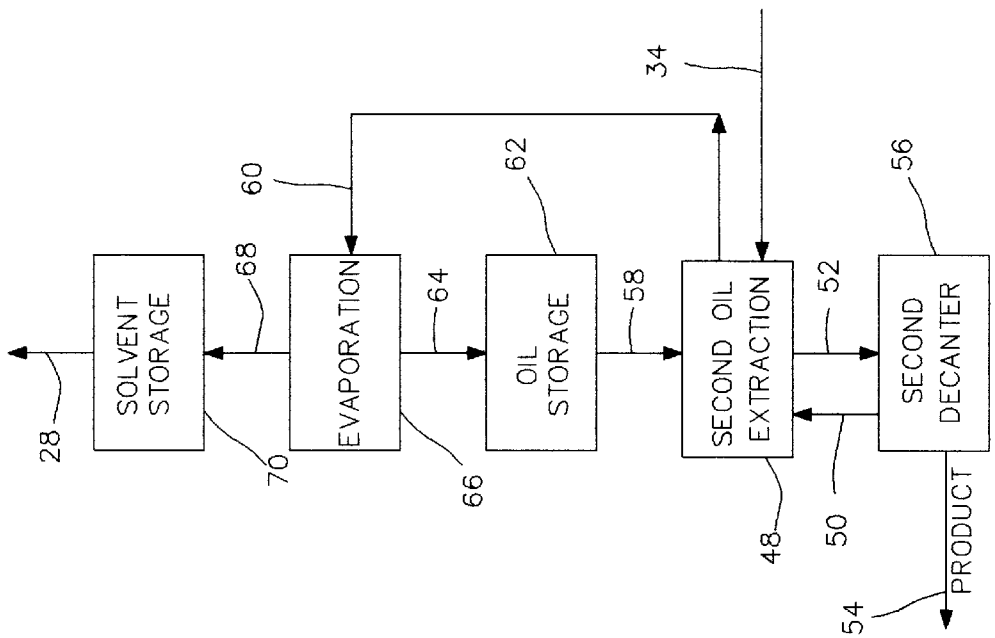
FIG. 3 is a flow sheet denoting a preferred method for separating solvent from dissolved depolymerized cellulose containing water and solvent.

Referring to FIG. 3, a flow sheet denoting a preferred method for separating solvent from a liquefied mixture of water soluble depolymerized polymers and solvent in water 34 from FIG. 1. The liquefied mixture 34 is then extracted in the second oil extraction stage 48, where an oil 58, supplied from oil storage 62, soluble in the solvent but insoluble in water containing water soluble depolymerized polymers, typically operating by counter flow, extracts solvent from the second oil extraction stage 48 to produce a feed 52, containing two phases, to the second decanter 56 where the lower level of the second decanter 56 produces a product 54 containing water and water soluble depolymerized polymers. The upper level of the second decanter 56 separates oil 50 for transfer to the second oil extraction stage 48 where extractate 60 is forwarded to an evaporation stage 66 where solvent is evaporated and condensed 68 and is stored in solvent storage 70 to provide solvent 28. Oil 64 from the evaporation stage 66 is stored in oil storage 62.

Figure 4:
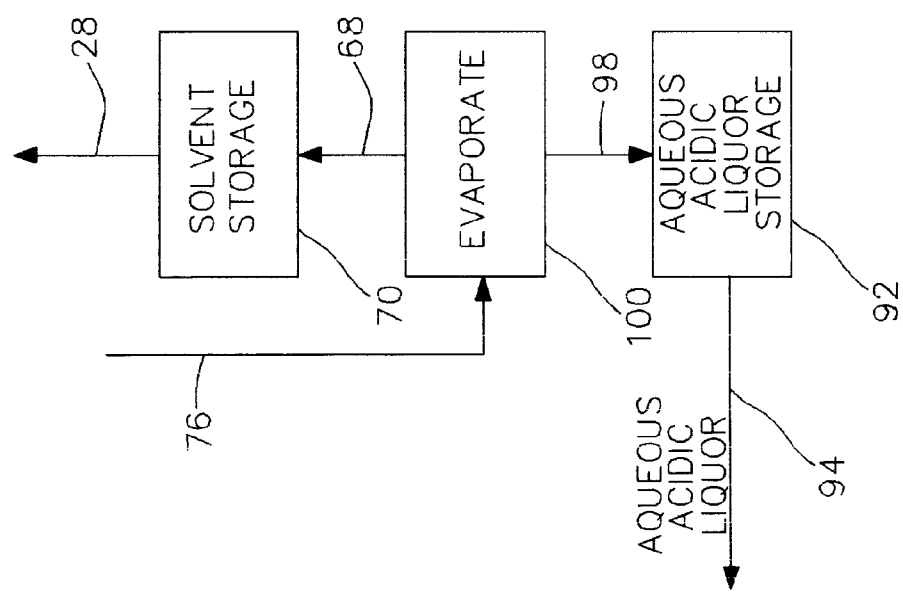
FIG. 4 is a flow sheet denoting an alternate method for separating solvent from a liquid containing aqueous acidic liquor and solvent.

Referring to FIG. 4, a flow sheet denoting an optional separating method for parting solvent from a liquid 76 containing the solvent and aqueous acidic liquor from FIG. 1, is transported to an evaporation stage 100 where evaporation and condensation of solvent 68 is stored in the solvent storage 70 to provide solvent 28. The evaporation stage 100 produces a product 98 of aqueous acidic liquor which is stored in aqueous acidic liquor storage 92, which provides aqueous acidic liquor 94.

Figure 5:
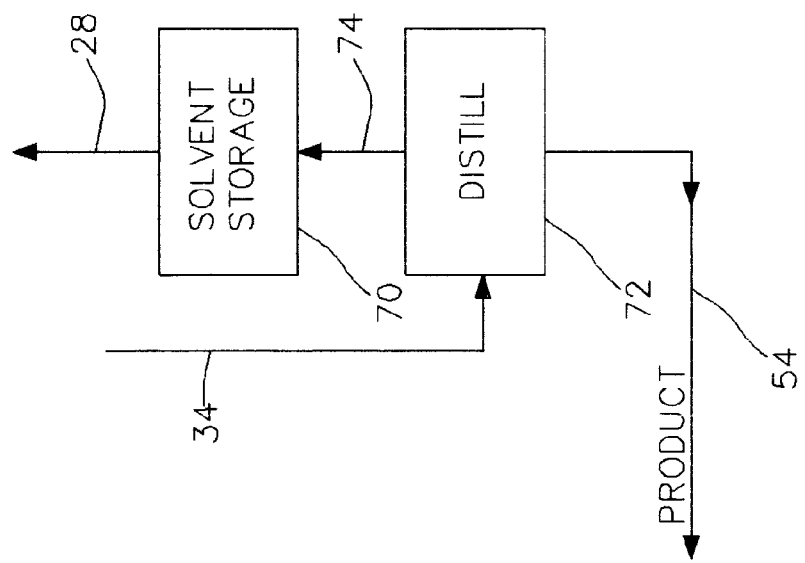
FIG. 5 is a flow sheet denoting an alternative method for separating solvent from dissolved depolymerized cellulose containing water and solvent.

Referring to FIG. 5 a flow sheet denoting optional separating method for separating solvent from a liquefied mixture of water soluble depolymerized polymers and solvent in water 34 from FIG. 1. The liquefied mixture 34, is transported to a distill stage 72 where evaporation and condensation of solvent 74 is stored in solvent storage 70 to provide solvent 28. The distill stage 72 bottoms produces a product 54 containing water soluble depolymerized polymers and water.

The following examples are set forth to illustrate more clearly the principles and practice of the invention. Where parts or quantities are mentioned, the parts or quantities are by weight.

EXAMPLE 1

Part A

Ten grams of cotton is added to 100 grams of 72% sulfuric acid from 72% sulfuric acid storage, in a 250 cc beaker at room temperature, with stirring, to dissolve and hydrolyze the cotton. After about twelve hours, the contents of the beaker is combined with 100 grams of a synthetic extractate composed of about 90% denatured ethanol and about 10% of 72% sulfuric acid to form a precipitate of water soluble carbohydrates from the hydrolyzed cotton. The contents of the beaker are then filtered to separate the precipitate from the filtrate which will then be processed in PART B. The precipitate is then extracted by 100 grams of denatured ethanol, from ethanol storage, to extract adhering acid from the precipitate. The extractate, contains about 90% denatured ethanol and about 10% of 72% sulfuric acid and is employed as a source of ethanol for EXAMPLE 2. The extracted precipitate, containing denatured ethanol, is then mixed with 100 grams of water to form a liquefied solution of water soluble carbohydrates and ethanol. Ethanol contained in the liquefied solution of water soluble carbohydrates will under-go separation of ethanol by vaporization and condensation of the ethanol in PART C.

Part B

The filtrate, from EXAMPLE 1 contains denatured ethanol and 72% sulfuric acid, will then under-go separation of ethanol from extraction with corn oil followed by vaporization of the corn oil containing ethanol. The ethanol vapor is condensed and stored in ethanol storage. The extracted 72% sulfuric acid, insoluble in the corn oil, is then stored in the 72% sulfuric acid storage.

Part C

Ethanol and water and a liquefied mixture of water soluble carbohydrates from EXAMPLE 1 will under-go separation of ethanol by extraction with corn oil followed by vaporization of the corn oil containing ethanol. The ethanol vapor is condensed and stored in ethanol storage. The extracted water soluble carbohydrates, insoluble in the corn oil, is then stored in the water soluble carbohydrates storage.

EXAMPLE 2

Part A

Ten grams of oven dried maple saw dust is added to about 100 grams of 72% sulfuric acid, from the 72% sulfuric acid storage from EXAMPLE 1 PART B, in a 250 cc beaker at room temperature, with stirring, to hydrolyze and dissolve the carbohydrates. After about twelve hours, the contents of the beaker is combined with about 100 grams of an extractate, from EXAMPLE 1 PART A, composed of about 90% denatured ethanol and about 10% of 72% sulfuric acid to form a precipitate of water soluble carbohydrates and water insoluble solids. The contents of the beaker are then filtered to separate the precipitate from the filtrate. The filtrate will be processed in EXAMPLE 2 PART B. The precipitate is then extracted by 100 grams of denatured ethanol, from ethanol storage from EXAMPLE 1, to extract adhering acid from the precipitate. The extractate contains about 90% denatured ethanol and about 10% of 72% sulfuric acid and is discarded. The extracted precipitate, then containing denatured ethanol, is then mixed with about 100 grams of water to form a mixture of ethanol and dissolved water soluble carbohydrates and water insoluble solids. The mixture is filtered to part water insoluble solids and forms a liquefied filtrate containing ethanol and water and dissolved water soluble carbohydrates. The filtrate will be processed in EXAMPLE 2 PART C. The water insoluble solids are then extracted with water to form water insoluble solids containing water and an extractate composed of about 90% water and about 5% of denatured ethanol and about 5% of dissolved water soluble carbohydrates. The extractate would normally be recycled to provide water to form a mixture in a similar liquefying procedure.

Part B

The filtrate from EXAMPLE 2 PART A, containing 72% sulfuric acid and ethanol, will under-go separation of ethanol and 72% sulfuric acid by vaporization of the ethanol to separate ethanol and 72% sulfuric acid. The ethanol, vaporized and condensed, is stored in ethanol storage. The recovered 72% sulfuric acid is stored in 72% sulfuric acid storage.

Part C

The liquefied filtrate from EXAMPLE 2 PART A, containing ethanol and water and dissolved water soluble carbohydrates, will under-go separation of ethanol and water dissolved water soluble carbohydrates. The liquefied mixture of ethanol, water and of water soluble carbohydrates will under-go separation of ethanol by extraction with corn oil followed by vaporization of the corn oil containing ethanol. The ethanol vapor is condensed and stored in ethanol storage. The extracted water soluble carbohydrates, insoluble in the corn oil, is then stored in the water soluble carbohydrates storage. The water insoluble solids are then oven dried resulting in 3 grams of water insoluble solids. The water soluble carbohydrates, containing water from the liquefied filtrate, are then oven dried resulting in 7 grams of water soluble solids.

EXAMPLE 3

Similar to TAPPI T222, ten grams of oven dried maple saw dust is added to 150 grams of 72% sulfuric acid, from the 72% sulfuric acid storage, in a 250 cc beaker at room temperature, with stirring, to dissolve carbohydrates. After two hours, the contents of the beaker are placed in a one quart glass jar and diluted with water to form a solution of about 800 ccs of sulfuric acid. The glass jar contents are then hydrolyzed at about 110° C. in a pressure cooker for about four hours. After hydrolysis the carbohydrates have become water soluble and leave lignin as a residue. The acidic liquor is decanted from the glass jar and discarded. The remaining residue is water washed and then filtered to separate the residue from water. The residue is then placed in a glass dish and dried in an oven at about 75° C. After cooling, at room temperature, the dish and contents are weighed and found to weigh 131 grams. The residue was discarded and the empty dish was weighed and found to weigh 128 grams. Therefore ten grams of saw dust contains 3 grams of residue as acid insoluble lignin, known as Klason lignin, as in TAPPI T222. Therefore oven dried maple saw dust contains about 30% lignin.

EXAMPLE 4

Part A

Eight grams of cotton is added to 100 grams of 70% zinc chloride in a 250 cc beaker at room temperature, with stirring, to dissolve the cotton. The contents of the beaker are then heated to about 100° C. After about six hours of continued heating the contents of the beaker is cooled to room temperature and then combined with 100 grams of acetone to form a precipitate of carbohydrates from the hydrolyzed cotton. The contents of the beaker are then filtered to separate the precipitate from the filtrate which will then be processed in EXAMPLE 4 PART B The precipitate is then extracted by 100 grams of acetone to extract adhering 70% zinc chloride from the precipitate. The extractate, contains about 90% acetone and about 10% of 70% zinc chloride and is then discarded. The extracted precipitate, containing acetone, is then mixed with 100 grams of water to form a liquefied solution of water soluble carbohydrates and acetone. Acetone contained in the liquefied solution of carbohydrates will under-go separation of acetone by vaporization and condensation of the acetone in EXAMPLE 4 PART C.

Part B

The filtrate, from EXAMPLE 4 contains acetone and 70% zinc chloride, will then under-go separation of acetone by vaporization to separate acetone and 70% zinc chloride. The acetone is vaporized and condensed, and is stored in acetone storage. The 70% zinc chloride, free of acetone, is then discarded.

Part C

Acetone and water and a liquefied mixture of water soluble carbohydrates from EXAMPLE 1 will under-go separation of acetone by extraction with corn oil followed by vaporization of the corn oil containing acetone. The acetone vapor is condensed and stored in acetone storage. The extracted carbohydrates, insoluble in the corn oil, is discarded.

EXAMPLE 5

Part A

Ten grams of cotton is added to 100 grams of 70% methanesulfonic acid in a 250 cc beaker at room temperature, with stirring, to hydrolyze and dissolve the carbohydrates. After about twelve hours, the contents of the beaker is combined with about 100 grams of acetone to form a precipitate of water soluble carbohydrates from the hydrolyzed cotton. The contents of the beaker are then filtered to separate the precipitate from the filtrate which will then be processed in PART B. The precipitate is then extracted by 100 grams of acetone to extract adhering 70% methanesulfonic acid from the precipitate. The extractate, contains about 90% acetone and about 10% of 70% methanesulfonic acid is discarded. The extracted precipitate, containing acetone, is then mixed with 100 grams of water to form a liquefied solution of water soluble carbohydrates and acetone. Acetone contained in the liquefied solution of water soluble carbohydrates will under-go separation of acetone by vaporization and condensation of the acetone in PART C.

Part B

The filtrate, from EXAMPLE 5 containing acetone and 70% methanesulfonic acid, will then under-go separation of acetone by extraction with corn oil followed by vaporization of the corn oil containing acetone. The acetone vapor is condensed and then discarded. The extracted 70% methanesulfonic acid, insoluble in the corn oil, is then discarded.

Part C

Acetone and water and a liquefied mixture of water soluble carbohydrates from EXAMPLE 5 will under-go separation of acetone by extraction with corn oil followed by vaporization of the corn oil containing acetone. The acetone vapor is condensed and discarded. The extracted water soluble carbohydrates, insoluble in the corn oil, is discarded.

EXAMPLE 6

Recovered sulfuric acid may be diluted by water and restored to the original concentration of 72% sulfuric acid by addition of calcium sulfate to form a hydrate of water insoluble gypsum. Twelve grams of calcium sulfate is added to 100 grams of 70% sulfuric acid in a 200 cc aluminum dish at about 50° C., with stirring, to form gypsum in about four hours. The gypsum formed at the bottom of the aluminum dish was water insoluble and was discarded.

What is claimed is:

1. A method to recycle an aqueous acidic liquor employed to subject glycoside bonds, contained in cellulose, to become substantially accessible to protons contained in the aqueous acidic liquor followed by hydrolysis in place to depolymerize the cellulose and hemicellulose accompanying the cellulose to provide water soluble depolymerized polymers and water insoluble solids also accompanying the cellulose, which comprises:

mixing together said aqueous acidic liquor containing said depolymerized polymers with an extractate from a previous extraction containing a solvent which is substantially soluble in said aqueous acidic liquor but substantially insoluble in said depolymerized polymers to form a precipitate of said depolymerized polymers, and setting apart to substantially divide the heretofore precipitated depolymerized polymers from a liquid containing said aqueous acidic liquor and said solvent, and extracting, by counter flow, heretofore precipitated depolymerized polymers with supplementary solvent to substantially extract any residual aqueous acidic liquor from heretofore precipitated depolymerized polymers, and allocating said supplementary solvent heretofore employed for extraction to precipitate additional depolymerized polymers, and dissolving the heretofore extracted precipitated depolymerized polymers, retaining solvent from the previous extraction, with an extractate containing water from a subsequent water extraction, to produce a mixture of water insoluble solids, and a liquefied mixture of dissolved depolymerized polymers, solvent and water and, dividing said liquefied mixture from water insoluble solids and, extracting, by counter flow, said water insoluble solids with water to substantially extract any residual solvent and heretofore dissolved depolymerized polymers to form an extractate containing water, solvent, and heretofore dissolved depolymerized polymers and to form water insoluble solids substantially free of solvent and heretofore dissolved depolymerized polymers and, allocating said extractate containing water, solvent, and heretofore dissolved depolymerized polymers for dissolving additional depolymerized polymers, and means for separating said solvent from said liquid containing aqueous acidic liquor to provide an aqueous acidic liquor substantially devoid of solvent, and means for separating said solvent from said liquefied mixture of dissolved depolymerized polymers to provide a liquefied mixture substantially devoid of solvent whereby dissolved depolymerized polymers substantially free of solvent is produced and furthermore the aqueous acidic liquor is substantially free of solvent and recovered for recycling to produce additional depolymerized polymers from cellulose and hemicellulose accompanying the cellulose and furthermore the solvent is recycled and additionally water insoluble solids substantially free of solvent and dissolved depolymerized polymers are produced.

2. The method of claim 1 where said water soluble depolymerized polymers includes water soluble dextrins, oligosaccharides, and glucose.

3. The method of claim 1 wherein water is added to the aqueous acidic liquor recovered by said separating means for addition of water used by hydrolysis of cellulose and any hemicellulose accompanying cellulose to form depolymerized polymers.

4. The method of claim 1 where said aqueous acidic liquor is recovered by said means for separating said solvent and is recycled for hydrolysis of cellulose and any hemicellulose accompanying cellulose to form additional depolymerized polymers.

5. The method of claim 1 where heretofore recycled aqueous acidic liquor contains depolymerized polymers.

6. The method of claim 1 where said aqueous acidic liquor contains about 40% water to about 10% water.

7. The method of claim 1 where said aqueous acidic liquor is selected from the group consisting of aqueous liquors of inorganic acids and aqueous liquors of organic acids including an individual or a combination of any of these acids and mixtures thereof.

8. The method of claim 1 where said aqueous acidic liquor contains sulfuric acid.

9. The method of claim 1 where said aqueous acidic liquor contains methanesulfonic acid.

10. The method of claim 1 where said aqueous acidic liquor is selected from the group consisting of aqueous liquors of inorganic salts including metal sulfates and metal halides including an individual or a combination of any of these salts and mixtures thereof.

11. The method of claim 1 where said aqueous acidic liquor contains zinc chloride.

12. The method of claim 1 where means for separating said solvent from said liquid containing aqueous acidic liquor and solvent is added to an oil substantially soluble in solvent but is substantially insoluble in the aqueous acidic liquor to form an oil phase containing solvent and an aqueous acidic liquor phase which are then divided by a decanter to separate the phase containing oil and solvent and the phase containing an aqueous acidic liquor.

13. The method as described in claim 12 wherein the phase containing oil and solvent is heated where the solvent is evaporated and condensed to part the solvent from the oil.

14. The method of claim 1 where means for separating said solvent from said liquid containing aqueous acidic liquor and solvent is evaporated and condensed to set apart the solvent from the said liquid containing aqueous acidic liquor.

15. The method of claim 1 where said means for separating said solvent from said liquefied mixture containing dissolved depolymerized polymers, solvent and water is added to an oil substantially soluble in solvent but substantially insoluble in the liquefied mixture to form an oil phase containing solvent and the oil and a phase containing dissolved depolymerized polymers followed by a decanter to separate the phase containing oil and solvent and the phase containing dissolved depolymerized polymers.

16. The method of claim 1 where means for separating said solvent from said liquefied mixture containing water and depolymerized polymers and solvent the solvent is evaporated and condensed to set apart the solvent from the water and depolymerized polymers;

the said liquefied mixture containing, solvent, water, and depolymerized polymers is heated to evaporate and condense the solvent to substantially set apart the solvent from the water and depolymerized polymers.

17. The method of claim 1 where said aqueous acidic liquor is a mixture of salts and acids.

18. The method of claim 1 where said aqueous acidic liquor contains sulfuric acid diluted by water and is restored to the original concentration of sulfuric acid by addition of calcium sulfate to form a hydrate of water insoluble gypsum.

* * * * *